United States Patent [19]

Ansorge

[11] 4,162,523

[45] Jul. 24, 1979

[54] STATIC CIRCUIT ARRANGEMENT FOR PRODUCTION OF 3-PHASE CURRENT OF VARIABLE FREQUENCY AND OUTPUT POWER

[76] Inventor: Werner Ansorge, Vogelbeerweg 3, 773 Villinger, Schwarzwald, Fed. Rep. of Germany

[21] Appl. No.: 789,641

[22] Filed: Apr. 21, 1977

[30] Foreign Application Priority Data

Apr. 28, 1976 [GB] United Kingdom ............ 17290/76

[51] Int. Cl.² ......................................... H02M 7/00
[52] U.S. Cl. ................................................. 363/43
[58] Field of Search ........................ 328/14, 22, 67; 330/262, 295, 297; 363/34, 36, 37, 43, 60, 101

[56] References Cited

U.S. PATENT DOCUMENTS

| | | | |
|---|---|---|---|
| 3,100,851 | 8/1963 | Ross et al. | 363/43 X |
| 3,458,721 | 7/1969 | Maynard | 328/14 |
| 3,641,566 | 2/1972 | Konrad et al. | 328/14 X |
| 3,896,365 | 7/1975 | Corry | 363/43 |
| 3,898,568 | 8/1975 | Barth | 328/14 |
| 3,919,619 | 11/1975 | Corry | 363/43 X |

Primary Examiner—William M. Shoop
Attorney, Agent, or Firm—Robert J. Eichelburg

[57] ABSTRACT

A static circuit arrangement for the production of three-phase current, comprising a plurality of waveform generating stages arranged in cascade. Each stage is adapted to provide either a positive or negative voltage.

The stages are controlled so that in the case of increasing a voltage from zero to a maximum (either positive or negative) the first stage is rendered conductive, then the second, third and so on until the nth stage is conductive together with all the other stages, and in the case of a voltage decreasing from a maximum to zero all the stages are conductive and these are rendered non-conductive one at a time starting with the nth, then (n-1)th and so on until the first stage is rendered non-conductive.

The first stage comprises three amplifier circuits, one for each phase, whereas the second and successive stages each comprise a single circuit which is common for all phases of a voltage to be generated. Each circuit of the first stage has its own phase load, e.g. a motor winding connected thereto.

23 Claims, 13 Drawing Figures

STATIC CIRCUIT ARRANGEMENT FOR PRODUCTION OF 3-PHASE CURRENT OF VARIABLE FREQUENCY AND OUTPUT POWER

The invention relates to an electronic circuit arrangement for power amplification of voltages and/or currents having any desired shape of time curve, by means of a plurality of coupled transistor push-pull amplifying stages each having its own current supply.

For obtaining high output powers in the electronic power art use is made to an increasing extent of power transistors for the final stages of amplifiers. The introduction of these power transistors has the following disadvantages: usually they do not permit a high operating voltage, and they are themselves subject to the risk of severe thermal damage by the specific losses suffered in the amplifying operation.

In the practice of introducing electronics into heavy current power techniques, for example, to obtain constant 50 Hz output with a high power, semiconductors are employed in the form of thyristors in so-called staircase generators. When using this technique, notwithstanding the use of a large amount of circuitry, the output power is accompanied by high harmonic components, which are often unacceptable to consumers i.e. users of electrical equipment.

The fact that low cost transistors can only carry low voltage loadings suggests the use of transistors connected in series in a cascade circuit, which solution has been adopted in various ways. Nevertheless this particular mode of use has only been seldom used because of heat and heat removal problems and because it was also attended by the problems of controlling transistors to which were applied various potentials.

In the U.S. Pat. No. 3,579,136 there is disclosed a power amplifier comprising a plurality of push-pull amplifier stages each having its own current supply. By the selection of the supply voltages of the individual push-pull stages in a particular manner the result is achieved that, as the input voltage increases the individual stages become effective in succession whilst the particular preceding stage is disconnected. In this arrangement the positive and negative branches of the individual push-pull stages are connected in parallel to each other. A disadvantage of this arrangement is that the individual stages have to be designed in correspondence with increasingly higher supply voltages.

According to one aspect of the present invention there is provided a static circuit arrangement for the production of three-phase current, comprising a plurality of waveform generating stages arranged in a series cascade, at least a first one of said stages comprising three waveform generating circuits connected in parallel, a respective current source for each stages the three circuits being controlled in use to render each one of said three circuits conductive in turn and connect the conductive circuit in series with the remainder of the cascade stages.

According to another aspect of the present invention there is provided a circuit arrangement for the production of three-phase current, comprising a plurality of waveform generating stages arranged in cascade in a single, non-parallel arrangement; three partial loads, one associated with each phase of the current to be supplied, and three thyristors controlled in use to apply consecutive half waves in turn to the partial loads.

Preferably at least some of the plurality of the wave form generating stages comprise transistor amplifier circuits.

Preferably each transistor amplifier is designed to have an output characteristic wave form conforming to the wave form of the desired output voltage.

The three wave form generating circuits may comprise transistor amplifier or thyristor circuits which are controllable to act as switching circuits.

In the case of producing an output voltage analogous to a sine wave, the transistor amplifier circuit or circuits for producing the peak of the sine wave may be replaced by a thyristor circuit or circuits.

Preferably the circuit arrangement comprises positive and negative branches wherein the transistor amplifier stages are push-pull stages connected in series with the emitter-collector paths of their transistors, which are respectively connected to an appertaining current supply, and wherein a voltage to be amplified is applied as a control voltage simultaneously to all stages. The transistors of the amplifier stages subsequent to the first stage are respectively blocked in the rest condition by a portion of the emitter-collector voltage of the transistors of the preceding stage, and with increasing control voltage are successively unblocked and activated.

By the use of an appropriate number of push-pull stages high output powers and voltages can be obtained.

An appropriate arrangement is one in which the individual amplifier stages are fed by tappings from a common mains transformer through rectifiers, in which case the component voltages between the tappings are suited to the particular gradient of the control voltage curve. There is thus achieved in a simple manner an optimum matching of the circuit arrangement to the voltage form which is to be amplified, besides a further reduction in the power losses in the individual amplifier stages.

Preferably a voltage divider is provided for effecting division of the collector-emitter voltage and comprises an ohmic fixed resistance and a Zener diode. At the same time there is obtained by the circuit in accordance with the present invention a limitation in the blocking voltage of the respective following stage, whereby the transistors of that stage are protected against overload.

For the purpose of separating voltage-wise the positive and negative amplifier branches in conditions of high voltage at the consumer load which is resistive, it is furthermore advantageous to connect a thyristor at the base point of both branches in series with the consumer load, which thyristor is also regulated by the control voltage.

For the purpose of applying the control voltage the arrangement includes a common control transformer having a plurality of secondary windings, each one associated with a separate transistor. In the case of amplifying a sinusoidal curve the control voltage comprises a chopped sine wave.

The present invention will now be explained and described, by way of example, with reference to the accompanying drawings, wherein.

Figure 1:
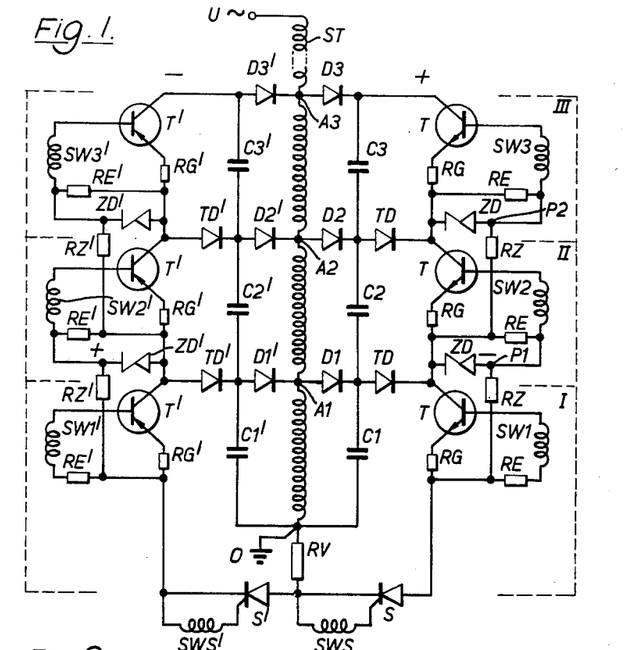
FIG. 1 is a three-stage single phase push-pull amplifier circuit which is useful in facilitating the understanding of the 3-phase circuit in accordance with the present invention.

FIG. 1 shows the circuit principle of an amplifier circuit arrangement having a total of three stages, wherein the individual stages I, II and III each consist of a push-pull amplifier of the same type. In this arrangement each positive amplifier branch comprises a NPN transistor T, a feedback resistance RG, an emitter resistance RE and a control winding SW. The negative branches of the individual amplifier stages comprise in each case of PNP transistor T', a feedback resistance RG', an emitter resistance RE' and a control winding SW'. The individual amplifier stages are fed from an auto-transformer ST, having three tappings A1, A2 and A3 through rectifiers D1, D1'; D2, D2' and D3, D3', and which itself is connected to a mains alternating voltage U. Preferably the tappings A1, A2 and A3 are arranged so that the partial voltages between the tappings are suited to the particular gradient of a control voltage curve. All the control windings SW1 to SW3 and SW1' to SW3' may be windings of a common control transformer which is provided with a control voltage which is to be amplified.

The collector-emitter feed voltage is taken off in each case at charging capacitors C1, C2, C3 and C1', C2', C3' respectively through isolating diodes TD and TD'.

The coupling of the individual amplifier stages for control purposes is effected by dividing the collector-emitter voltages of the individual stages by means of voltage dividers, each consisting of a fixed resistance RZ and a Zener diode ZD in the positive branch, and in the negative branch the respective resistances RZ' and the Zener diode ZD'. In each case the partial voltage is applied to the base of the transistor T and T' respectively of the next higher stage.

At the end points of the amplifier circuit branches there are situated respective thyristors S, S', which are controlled by control windings SWS and SWS' respectively of the control transformer, which also comprises the windings SW, SW' connected in the emitter-base circuits of the transistors T and T' respectively. By means of the thyristors S and S' the positive and negative branches of the entire circuit arrangement are separated from each other. They are connected in common to a consumer load RV, whose second pole is connected to zero potential of the auto-transformer ST.

Figure 2:
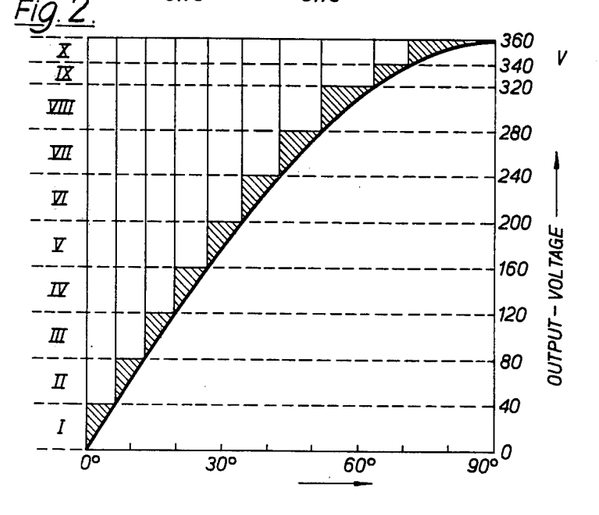
FIG. 2 is the positively ascending branch of a sine output voltage plotted as a time-voltage diagram of a single phase circuit arrangement having a total of ten stages.

In explaining the mode of operation of this circuit arrangement shown in FIG. 1 it will be assumed that it is concerned with the amplification of a pure sine voltage which is to be amplified to 360 volts and that this is effected for example by means of a ten-stage push-pull amplifier with ten amplifying stages I to X. By reference to FIG. 2 is will be seen that the collector-emitter supply voltages of the amplifier stages I to VIII are respectively of equal magnitude and amount to 40 volts. These amplifier stages I to VIII are allocated to the steeper portion of the voltage curve, whilst the two upper-most amplifier stages IX and X are in each case allocated a 20-volt collector-emitter supply voltage, and are associated with the portion of the voltage curve which is becoming flatter.

Starting from the beginning of the positive sine half cycle, in which all transistors T of the positive branch, with the exception of that of the lowest stage 1 are still blocked, the first thing that happens is that the transistor T of the amplifier stage I is controlled proportionately to the rising control voltage, so that the full voltage at the capacitor C1 is applied to the consumer load RV. At the same time the thyristor S is rendered conductive, whilst the thyristor S' remains blocked. As soon as the transistor T of the amplifier stage I has been fully controlled, the blocking negative potential is removed at point P1 of the voltage divider RZ–ZD, which has been blocking the transistor T of the second amplifier stage II, so that upon further increase of control voltage in the winding SW, the transistor T of the second amplifier stage II becomes controlled in proportion to the rising control voltage, and thereafter the output voltage of 80 volts becomes applied to the consumer load RV. As soon as the transistor T of the second amplifier stage II becomes fully controlled the negative blocking voltage is then removed at the tapping point P2 of the voltage divider RZ–ZD of the second amplifier stage II, so that upon further increase of the control voltage the controlling of the transistor T of the third amplifier stage III is effected, and so on. As soon as the tenth amplifier stage X (FIG. 2) is fully controlled, there will be applied to the consumer load RV the full voltage of 360 volts. During the descending portion of the first positive half cycle the individual amplifier stages X to I are switched off successively from the top to the bottom in an analogous manner. At the beginning of the negative half cycle the individual amplifier stages in the negative branch are then successively controlled in an analogous manner, whereupon, when passing through the zero position, the thyristor S is blocked and simultaneously the thyristor S' is rendered conductive.

Although the illustrated embodiment has been described with reference to producing a wave form analogous to a sine wave, it is possible to operate the circuit to amplify any suitable voltage form, for example even chopped or unidirectional control voltages which would make it necessary to employ, instead of the control windings SW, other suitable coupling means for biasing the base of each transistor.

Figure 3:
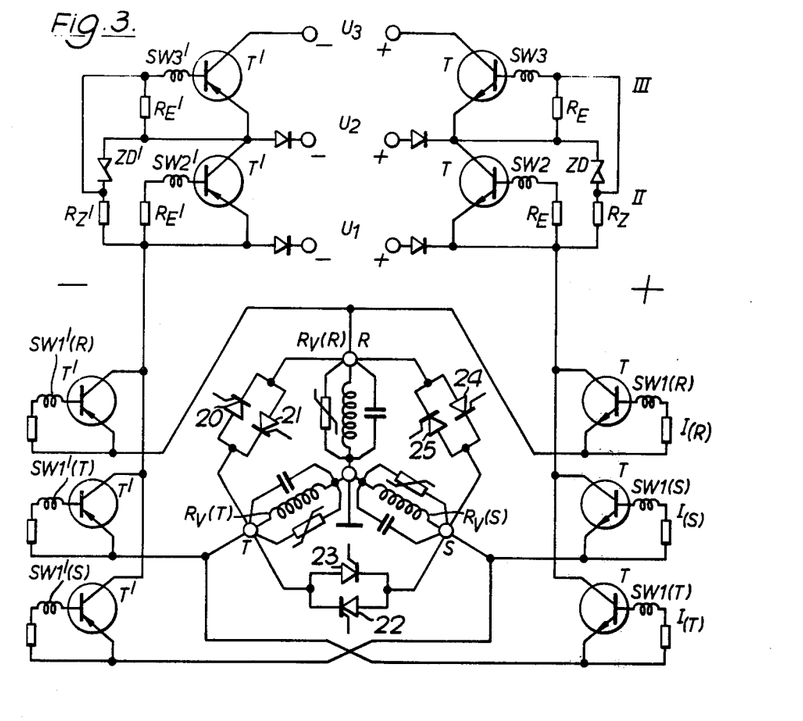
FIG. 3 is a simplified circuit diagram of an amplifier circuit in accordance with the present invention for three-phase operation.

Referring now to FIG. 3 which shows a three phase circuit arrangement for providing three-phase voltage to respective consumer loads RV(S), RV(S) and RV(T). The circuit of FIG. 3 is a modification of FIG. 1 in so far that the amplifier stage I now comprises three parallel connected stages I(R), I(S) and I(T), each having its own transistors T and T' and control windings SW1(R), SW1'(R); SW1(S); SW1'(S) and SW1(T), SW1'(T).

By suitable control of the parallel arranged amplifier stages they are caused to function individually in timed succession, say at a phase angle $\psi$ of 120°, and, during the course of their functioning each stage is connected in series to the upper stages, and each operates upon its own consumer load resistance RV(R), RV(S) and RV(T) which may comprise the phase windings of a three-phase electric motor, for example.

A practical application of the embodiment of FIG. 3 is supplying current to asynchronous three-phase motors, which do not require a precisely true-to-shape sine form. A suitable modification of shape is possible with a substantial simplification of the triple arrangement necessary for the example of a three-phase motor, in that the upper stages are employed in common for the three parallel arrangements per half cycle in stage I (+R +S +T: −R −S −T). As a result for the plus and minus half cycle there will be required only two upper cascade arrangements II, III and so on instead of six upper cascade circits which have been necessary previously.

The load resistances RV(R), RV(S) and RV(T) associated with each amplifier pair of the stage I (+ and −), are connected in star formation between the terminal points R, S and T and a central terminal which is ground or zero. Pairs 20, 21; 22, 23; and 24, 25 of opposed thyristors are connected in delta form between the terminal points of the star connected load resistances RV(R), RV(S) and RV(T). These thyristors 20–25 are not absolutely necessary for the basic function of the circuit, but they perform some additional tasks.

According to which one of the two thyristors is fired at the time instant when the cutting point of the sine curve has reached its termination, the stored up energy is switched to the next load or winding so that the direction of the rotary field is determined. Simultaneously the next amplifier I is also controlled for the corresponding similar direction of rotation.

If through a predetermined control programme, a counter-action is intentionally switched simultaneously through the thyristors 20–25 as well as through the amplifiers I, this step will represent a purely electronic reversal of the direction of field rotation, having, in the simplest manner, the effect of a reversing switch without sparking.

Figure 4:
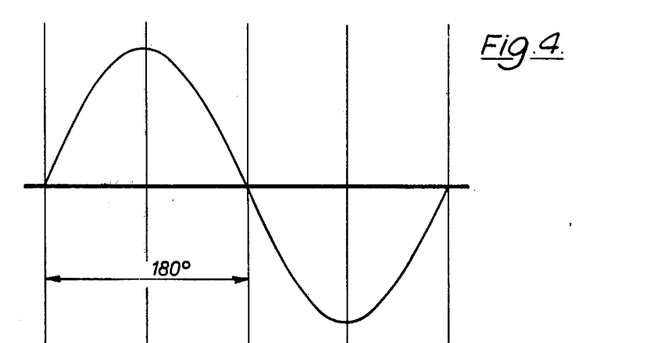
FIG. 4 is a sine wave.
Figure 6:
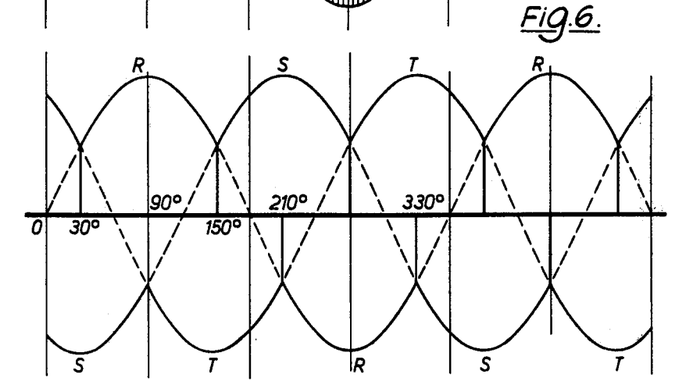
FIG. 6 shows a three-phase sine wave.

The conditions for reforming of the sine curve corresponds to the following considerations:

In FIG. 4 there is shown a normal sine curve and FIG. 6 shows a three-phase current. Each of the three curves has phase displacement $\psi = 120°$, and they intersect each other at a phase angle $= 30°$ in a position leading and trailing the zero transition. This intersection takes place at a level $\pm 0.5$ of the peak amplitude $= \pm 1.0$, because sine $30° = 0.5$. Because these curves respectively represent the voltage or the current shape, the power delivered at the time instant of intersection $U \times I$ is $$0.5 \times U \times 0.5 \times I = 0.25 UI$$

i.e. the instantaneous power at $\psi = 30°, 150°, 210°$ and $330°$ amounts at the cutting points to only ¼ of the peak power.

Figure 7:
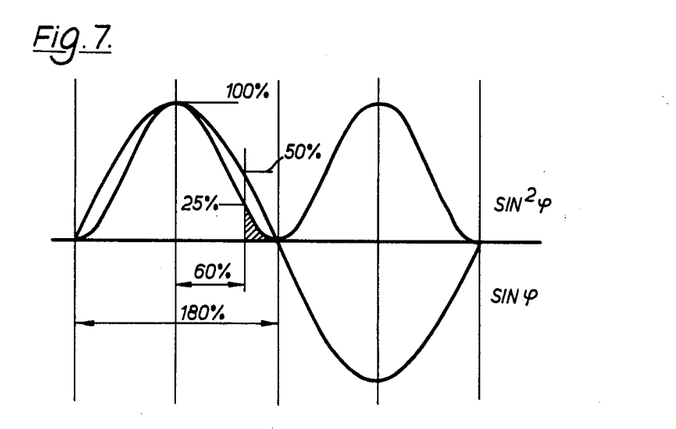
FIG. 7 shows wave forms of sine $\psi$ and sine $2\psi$.

Referring now to FIG. 7, the instantaneous power, i.e. for each phase angle amounts to $$P = (\sin \psi \cdot U) \cdot (\sin \psi \cdot I)$$

By simultaneously putting the peak value $U = 1$ and the peak current $I = 1$ there is obtained $$P = (\sin \psi \cdot 1) \cdot (\sin \psi \cdot 1) = \sin^2 \psi$$

The curve sin $\psi$ applies in each case for $U = 1$ or $I = 1$.

The small triangular black surface in FIG. 7 indicates the electrical work, which (four times in each cycle) is suppressed by the cutting of the sine curve. This represents no loss value, it is merely unused.

From FIG. 7 it may easily be seen that the omission of the overlapping portions of the curve have only a slight effect on the total curve. This makes possible an uninterrupted supply of the three motor windings RV(R), RV(S) RV(T) separately and in succession with the basic power from stage I and, in each case, through only two upper cascades (for + and −) with the residual power. The appertaining control apparatus must be designed for the corresponding relative relationship of the control signals. These consist of sine curves, which, according to FIG. 6, at a position $\psi = \pm 60°$ from the curve centre are respectively cut at $\psi = 90°$.

Figure 5:
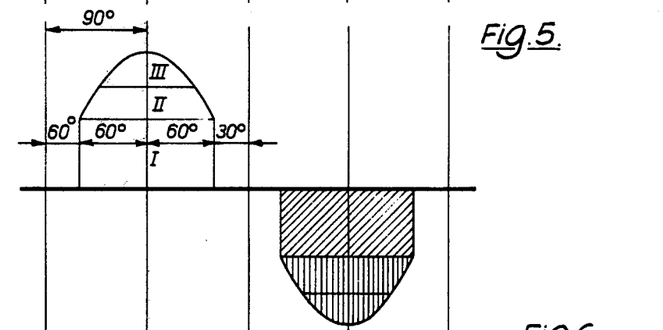
FIG. 5 shows control or switching wave forms.

In order that the circuit of FIG. 3 can provide a power analogous to that of three-phase current, the control signals to the amplifiers are in the forms of chopped sine curves as shown in FIGS. 5 and 6. The control signals are provided by a control device, which periodically and successively switches through the control signals at the correct time instant to the correct amplifiers of stage 1, and which at the same time controls the upper amplifier stages II, III and so on in a suitable manner. In FIG. 5 stage I provides the part of the wave form referenced I whilst the parts II and III are provided by the stages II and III as in FIG. 1.

In order to obtain the substantially rectangular shape to the part I of the wave form, the stages I(R), I(S) and I(T) are operated as pure switches, and the transistors are for this reason capable of being more highly loaded because they do not have to traverse any amplifier curves. If desired the transistors T and T' in the stages I(R), I(S) and I(T) may be replaced by thyristors. In such a case, there is then imposed upon the rectangular curve the triggered thyristor, the residual sine curve being produced by the transistor amplifiers of the upper stages II, III and so on. In this way precisely the same output shape is achieved as was achieved earlier with transistors.

Figures 13, 14:
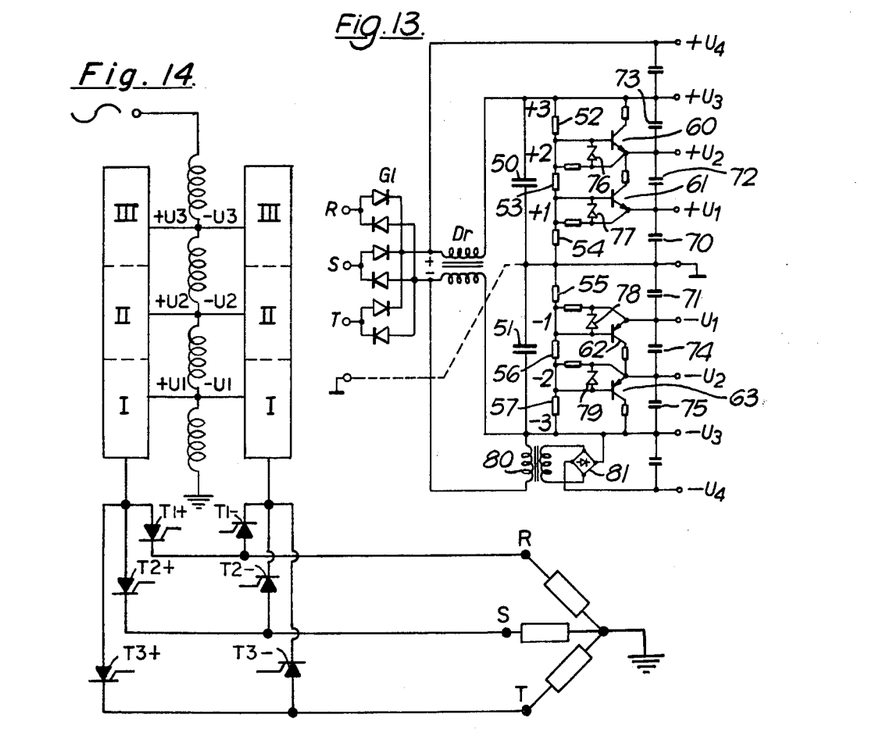
FIG. 13 is a schematic circuit diagram of a modification of the circuit shown in FIG. 11.
FIG. 14 is a circuit diagram of a further embodiment of the invention.

Various modifications of the circuit are possible. For example, as illustrated in FIG. 14 the two stages I are equipped with only one transistor or thyristor, as are also the upper stages (II etc.). However below the two stages I are, three thyristors are connected in parallel, i.e. three (T1+, T 2+, T3+)for the positive-going half wave and three (T1−, T2−, T3−) for the negative-going half wave. In this position they act as distributing switches in that, being ignited in the proper order, they switch the resultant output current of the cascade stages one after the other to the 3-phase inputs R, S, T of a 3-phase motor, for example. Since these currents invariably pass zero the thyristors are automatically extinguished at the correct instant.

For certain practical applications the power supply source for a three-phase motor may depart from an accurate sine shape in respect of the upper shape of the residual sine curve. For example, this upper portion may be formed of steps along the sine curve so that the main shape of the sine wave is substantially imitated. In such a practical application the transistorised amplifier stages for producing the upper part of the sine wave may be replaced by thyristor stages having small switching levels at the correct time instants so as to tend towards the sine shape.

If desired the circuit of FIG. 3 may be operated so that a variation of the amplitudes of all 3-phases of the stabilised-frequency polyphase current, which may be deemed necessary to match the frequency for optimum exploitation of a polyphase current motor, can be easily achieved in that the amplitudes of the 3-phase control voltages, produced in a control unit, are automatically controlled together with frequency in such a way as to affect the amply dimensioned amplifier cascades to a varying degree or, alternatively the unidirectional supply voltages will have to be controlled accordingly.

The control device for use with the modified circuit arrangement of FIG. 3 is capable of selecting from a sequence of pulses of a high basic frequency, those pulses resulting from the operation of counting stages, which will serve, at the correct time instants, for the firing and quenching of the correct thyristors. By the use of such a control device the possibility is afforded of varying the three-phase current frequency as desired, whilst it is necessary only to vary the pulse fundamental frequency in order to obtain, at the output side, a variable three-phase current, which possesses the same characteristics at each frequency.

In the illustrated embodiment of the invention the current supply must always be effected from a continuous current voltage source having a plurality of tappings for partial voltages. In most cases this voltage source is produced by rectification of the general supply voltage. In such cases if the available alternating voltage for the total output power is converted through a large mains transformer in order to supply the desired output voltages, such a supply equipment would be very large, expensive and heavy.

Figure 11:
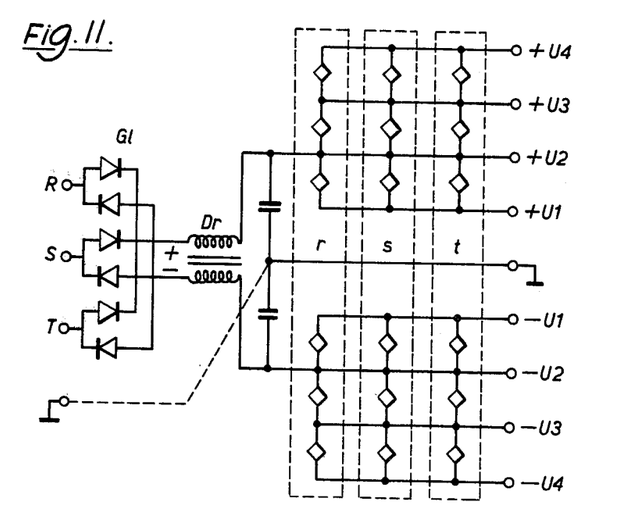
FIG. 11 is a schematic circuit diagram of a circuit for supplying power to the individual stages.

A substantial economy is obtained—for example if the ordinary current supply is available in the form of three-phase current at 50 or 60 Hz—by direct rectification of the three-phase voltages with respect to zero. For obtaining, as a reference potential, both a positive as well as a negative continuous voltage supply with respect to zero, only half wave rectifiers can be adopted in this case. For each of the three phases there will be obtained two voltages with the ripple as shown in FIG. 6 namely 50%. For achieving the desired advantage of great economy in the production of both voltages at the desired powers filtering and smoothing means in the form of LC (inductance-capacitance) members are used as shown in FIG. 11. By means of potential-free full wave rectifier arrangements of known type it is possible, by addition or subtraction applied to the fixed base voltage, to produce any desired partial voltages, which themselves require no further smoothing because, as a result of using the three phases and the full wave rectification six rectification peaks will be produced per cycle. A ripple factor of the voltage amounts to sin 90°−sin 60°=1.0−0.866=0.134=13.4% Such an amount of ripple is of no significance in practical operation, for example in the case of a three-phase motor. Nevertheless the achieved advantage is very great because a voltage transformation is necessary only for about ⅓ of the power, and furthermore the achieved current supply is relatively constant in power delivery, that is to say is not subjected to any great variations under load.

In order to avoid the risk of sudden power surges of 25%—with a changeover voltage amounting to v/2 i.e. at the sine 30° position, on transition from one phase R, S, T to the next S, T, R (see FIGS. 5 and 6)—the circuit of FIG. 3 can be operated so that the changeover voltages from one of the phases to the next can take place at different levels to that shown (v/2) in FIGS. 5 and 6. This may be done by reducing the changeover voltage for the stages I of FIG. 3 while increasing them for stages II and III or further stages.

Figure 8:
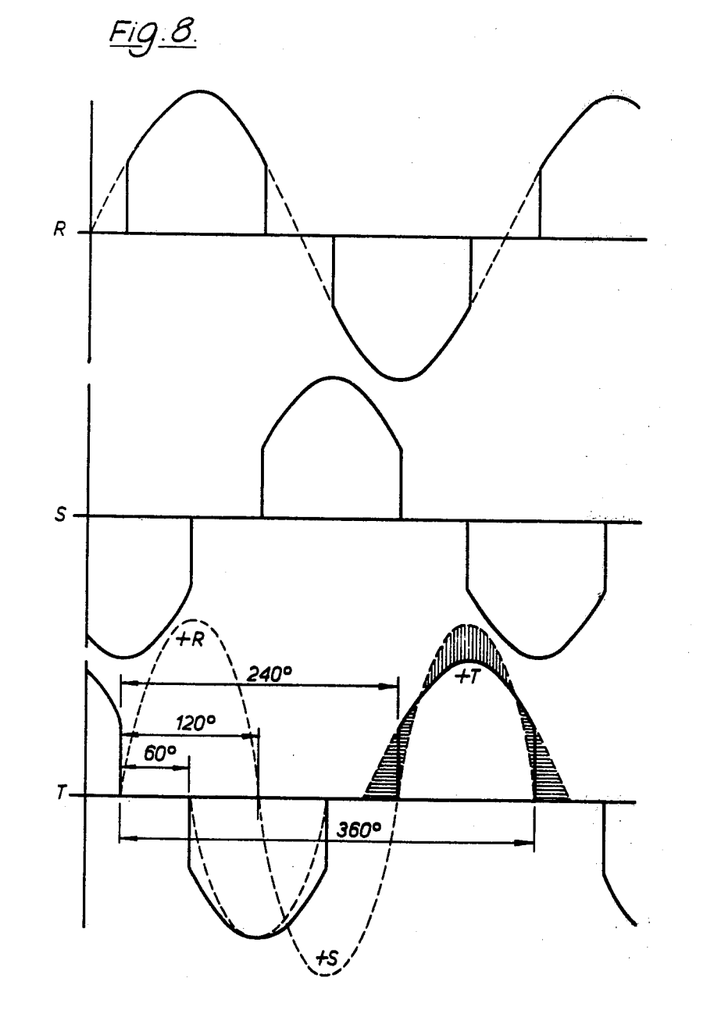
FIGS. 8, 9 and 10 show a modification of the control or switching wave forms to those shown in FIGS. 5 and 6.

On the other hand, if it is desired to avoid completely the risk of sudden power surges then the changeover from one phase to the next can take place at zero volts, rather than v/2 volts, as will be explained with reference to FIGS. 8, 9 and 10. FIG. 8 shows the separation of the 3 phases R, S and T, of FIG. 6 i.e. a triple reproduction of FIG. 5, taking into account phase position. In the detail illustrating phase T it is made apparent how sudden power surges can be avoided completely by means of a sinusoidal waveform W which has a period corresponding to 240° or ⅔ of the desired output frequency i.e. a fully shaped wave according to FIG. 10. The frequency of this sinusoidal wave by means of which the amplifier cascades are controlled, amounts to 1.5 times that of the desired output polyphase frequency for the following reason: As FIG. 5 shows, each amplitude of the clipped sinusoidal wave has a duration corresponding to a phase angle of 120°. Within this area an un-clipped halfwave is superimposed on a substantially rectangular pulse and the full cycle of the wave is evolved within 240° of the polyphase current frequency (see also FIG. 9). This means that for a full cycle of the polyphase current frequency there is obtained 1.5 cycles of the control or supply frequency. If two such sinusoidal waves according to FIG. 9 are used, which are mutually phase-displaced through 60°, and if these are subjected to full-wave rectification, there is obtained the wave form according to FIG. 10 which now corresponds to the wave forms of FIG. 6, the difference being however that each half wave of sinusoidal shape originates from "zero" and cannot exhibit any surges or any d.c. component.

A further advantageous facility arises here: If one of the feasible circuit arrangements incorporates thyristors, it is advisable to extend the zero condition of the half waves by such an amount that the circuit commutation or off time of the thyristors is reliably exceeded, in order to extinguish the thyristors automatically. This dwell time in the zero condition can be achieved by electrically clipping the control half-waves at the low end on transition to the next half-wave, or in that the cascade stages I receive a suitable bias which opposes the control half-wave.

It appears from FIG. 8 that for an equal peak voltage (see the halfwave curve−T) the area of the sinusoidal wave W indicated by dotted line is less than that of the clipped original sinusoidal wave. This means that the corresponding power is likewise smaller. To compensate for this, the amplitude of the wave form having 1.5 times the sinusoidal frequency of the desired output polyphase current would have to be increased by an amount which, in terms of power, makes the sum of the horizontally shaded part-area outside the half sinusoid equal to the vertically shaded part-area included in the half sinusoid, as is shown for the +T halfwave of FIG. 8.

Figure 9:
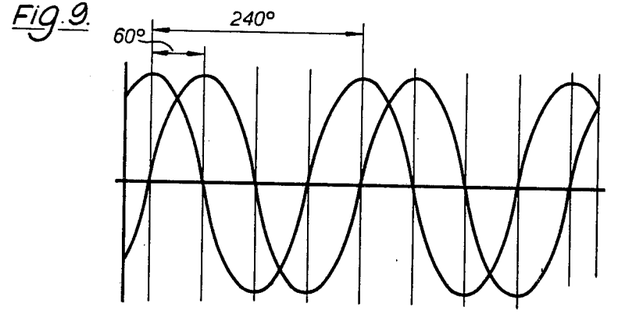
Figure 10:
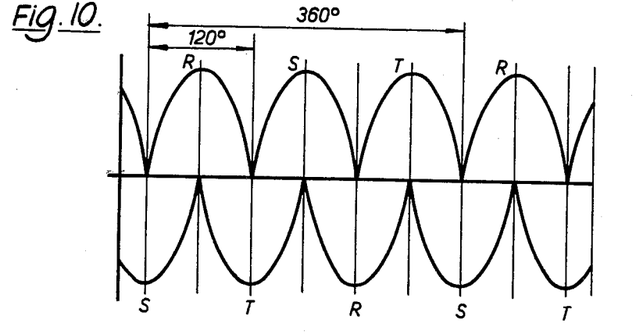

FIGS. 9 and 10 show one sinusoidal wave form which serves only for the positive half waves, and the other sinusoidal wave form which serves only for the negative half waves. Therefore, an automatic changeover system for superimposing the sinusoidal control voltages on the six transistors T and T' of the two stages I (FIG. 3) must be provided for supplying the loads RV(R), RV(S) and RV(T) in FIG. 3, e.g. the three windings of a polyphase current motor. Neither the method of electronically generating the controlling voltages nor their coupling to the transistors of the amplifier cascade and the automatic changeover system will be explained in detail since it is considered that these arrangements can be developed in various ways, using means known to the electronics engineer skilled in this art. What is relevant is the achieving of a comparatively smooth inception and termination of the supply current by means of sinusoidal characteristics which avoid the generation of high voltage peaks which would be inevitable in the case of square shaped wave forms. This leads, moreover, to greater reliability of the circuit in accordance with the present invention both internally as well as externally and, at the same time, reduces the harmonics and thus dissipation, and also the heat generated in the motor.

Figure 12:
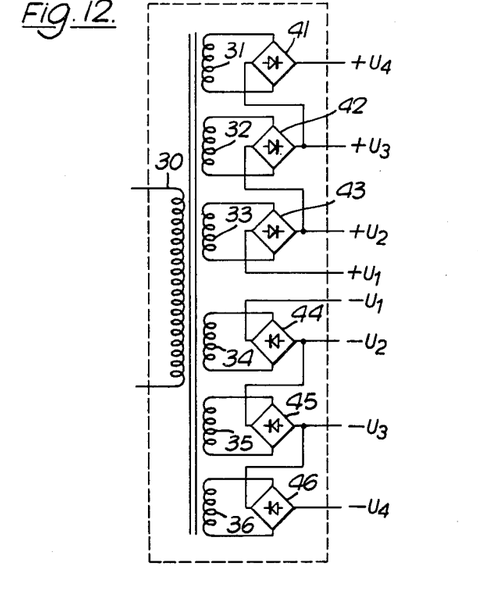
FIG. 12 is a circuit diagram of one of the rectifier arrangements of FIG. 11.

Referring to FIG. 11 in greater detail the three elongate rectangles r, s, t, symbolise three rectifier arrangements, which, for example add or subtract each of the three potential-free voltages to the voltages $+U2$ and $-U2$. As shown in FIG. 12 each rectifier arrangement consists of one mains transformer 30 having 6 isolated secondary windings 31 to 36, to each of which one bridge rectifier 41 to 46 or some other type of rectifier is connected, whose output unidirectional voltages are connected in series in a suitable manner in order to obtain the desired partial and synthesis voltages $-U4$ to $+U4$. For supplying the rectifier arrangements r, s, and t there are employed three current supply phases R, S and T which are rectified so that all the partial voltages, as already described, additionally receive only a ripple factor of 13.4% (only from the additional voltages).

A smoothing inductance Dr comprising two windings wound upon a common iron core is connected between the current supply phases R, S, T and the rectifier arrangements r, s, and t. If the windings are connected in such a manner that the plus and minus unidirectional currents mutually compensate each other, then the iron core can be stacked without an air gap or only with a small air gap, whereby there is achieved a stronger coupling of both coils and larger inductive reactances, that is to say a better smoothing effect. Apart from this there takes place an additional smoothing effect in consequence of reciprocal transformer action by the currents of the smoothing condensers, as also of the useful currents, in which case the smoothing effect increases in proportion to the output currents.

A further considerable reduction in the cost and the size of the power supply unit in connection with obtaining component voltages will now be explained with reference to FIG. 13.

Like FIG. 11, FIG. 13 features the same principal rectification from the polyphase network by means of the half-wave rectifier G1 for the 3 phases. Here, $+U3$ and $-U3$ are the direct current outputs following such rectification and filtering by means of the choke Dr and the two principal charging capacitors 50, 51. In order to derive the lower voltages $+U2$, $+U1$, $-U1$ and $-U2$ without a mains transformer as shown in FIG. 12, the charging capacitors at the outputs are charged from the principal rectifiers by automatic electronic means precisely to the desired potentials.

Across each of the capacitors 50, 51, is connected a resistive potential divider comprising resistors 52 to 54 and 55 to 57, respectively. These potential dividers serve to provide the biasing voltages for NPN transistors 60, 61 and PNP transistors 62, 63, respectively. The junctions of the resistors 52 and 53, and 53 and 54 are marked $+2$ and $+1$, whilst the junction of the resistor 52 with the lead to the terminal $+U3$ is marked $+3$. Similarly the junctions marked $-3$, $-2$, and $-1$ correspond to the junction of the resistor 57 with the lead to the terminal $-U3$, and the junctions of the resistors 56, 57 and 55, 56, respectively. For convenience $+1$ to $+3$ and $-1$ to $-3$ will also be used to identify the potentials at these junctions. The emitters of the transistors 60 to 63 are connected to terminals $+U2$ to $-U2$, respectively. Capacitors 70, 71 are connected between ground and terminals $+U1$ and $-U1$, respectively, and capacitors 72 to 75 are connected respectively between the terminals $+U1$, $+U2$; $+U2$, $+U3$; $-U1$, $-U2$ and $-U2$, $-U3$.

The arrangement operates as follows:

$+3 +2 +1 -1 -2 -3$ are the potentials across two reference potential dividers between $+U3$ and 0 and between $-U3$ and 0. $+3$ is identical with $+U3$, and $-3$ with $-U3$. The same applies to the intermediate stages $\pm 2$ and $\pm 1$, if the capacitors 72, 74, 70 and 71 at the outputs are charged to the same potentials in every case. However, as soon as the four tappings $\pm U1$ and $\pm U2$ are loaded either from without or from within, their potentials are reduced, and this reduction produces potential differences in relation to their associated potential divider points $\pm 1$ and $\pm 2$. These differential voltages act, at the very instant of their generation, as control voltages upon the transistors 60, 61 and 62, 63 concerned which will then likewise immediately draw current from the adjacent higher stages and pass this current to their own output until their potential is again equal to the associated junction of their potential divider. This capacity for fast variation enables comparatively small capacitors 70 to 75 to be used at the outputs, whereas the two principal charging capacitors 50, 51 on the other hand, should be amply dimensioned. In any case, this would be required for efficient smoothing in connection with the principal rectification. Zener diodes 76 to 79 associated with the transistors 60 to 63 prevent excessive base-emitter voltages and serve to protect the transistors 60–63.

If large currents are to be controlled in this manner, it will be necessary to use suitable high-current transistors which latter will have to be driven with accordingly increased control power. In order to avoid having to make the potential divider too low-ohmic in such a case (for they participate in the generation of the control current) the insertion of driver stages (not shown) is recommended, although each of these drivers will need its own power supply because they operate at different potentials. It will be sufficient to provide a small mains transformer having a suitable number of secondary windings for comparatively low voltage and power, plus rectification.

The example illustrated in FIG. 13 provides for NPN transistors 60, 61 in the positive section, and PNP transistors 62, 63 in the negative section. If such complementary types are not readily available, the embodiment of FIG. 13 can be arranged to use NPN transistors in the negative sector in such a way that their function in the required sense is ensured. This requires suitable modification of the circuit arrangement which is within the ability of a man skilled in the art and will not be described here. Similarly, the driver stages (not shown) which may need to be inserted will meet this need if it arises.

The above-described method for obtaining the component voltages $\pm U1$ and $\pm U2$ is of course confined to voltages smaller than ±U3. If it is desired to derive higher voltages, for example ±U4, the explanations given in connection with FIG. 11 will apply. However, FIG. 13 shows two further possibilities also in this context:

Applied to the inputs of Dr, that is to the junctions marked + and −, are voltages according to FIG. 6 which are permanently (low-impedance) coupled to the polyphase network via the rectifier G1. With equally low impedance to alternating current, the two outputs of Dr are taken to neutral or ground via the two large charging capacitors 50, 51. This means that the voltage drops across the two windings of Dr can produce a high power. In the positive sector of FIG. 13, the residual upper sinusoidal components above +U3 are taken directly to the output +U4, after rectification from mains. Roughly, speaking, the shape of these residuals of the characteristic resembles a single-phase half-wave rectification characteristic, but as a higher frequency, namely three times the supply frequency.

In the negative sector of FIG. 13, the identical (negative) residual components of the characteristic are taken to the primary winding of a transformer 80. After transformation to a desired voltage, these residual components are likewise taken to an output (−U4) via a full-wave rectifier 81, but here the output voltage is of desired magnitude and available in the form of a well-smoothed direct current voltage.

The transformer 80 may be comparatively small because the frequency to be converted is 3 times as high and the upper stages of a cascade amplifier, if connected, require in any case only part of the total power. While the quality of the characteristic improves by the processing of its residual components, failure to achieve sinusoidal shape is of secondary importance for the generation of the direct voltage (U4).

Another possibility of converting the remaining upper sinusoidal components into an especially high unidirectional voltage at the terminals +U4 and −U4 can easily be realised by employing the Villard doubler circuit which need not be explained here in further detail, since it is generally known.

Many practical applications of the present invention are possible because the described circuit arrangement are able to regulate continuously the frequency and amplitude of the supply voltage for 3-phase motors. Such applications include a rolling mill, where the speeds of the motors used in the various rolling stages must be balanced accurately, which can now be done automatically and very easily by the described circuit. This advantage may also acquire great importance in the paper and textile industry. The ability electrically or electronically to make a changeover in frequency will in future make it possible so to extend the automatic control system of a sequence programme of a machine tool that in each of the individual process steps, the suitable speed can also be selected automatically, for example so as to use low speeds for rough turning, high speeds for fine turning, and particularly low speeds for reaming or thread-cutting.

This possibility may, to a high degree, prove to be a technical and economic advance in mass production on, for example, automatic lathes.

To achieve simultaneously controlled operation of several machine tools, for example, the latter may be connected to the output of a cascade generator in parallel configuration, provided that the power of the latter is dimensioned sufficiently high to allow this. If, however, in a production installation a considerable number of machines must be operated in a mutually independent controlled manner, there is the possibility of utilizing an installation, which replaces the conventional mains supply, to supply a service voltage which is sub-divided by steps and supplied to all the machines, each separate machine having its own static power generator. In this way, considerable cost reduction and space reduction can be obtained so that the total advantage of the machine tends to compensate for the production cost of the cascade generator by saving costs normally due to the gear-drive transmission normally provided and the space necessary for such an arrangement. Further, the machine is also lighter with the omission of these arrangements.

With regard to the common supply aggregate, there is the possibility of using a rectifier for the normal 50/60 cycle mains but, particularly with reference to large output power there is the disadvantage of a rather large voltage ripple which is difficult to smooth. In the example mentioned above, that is factory installation or an installation having a large output, a machine converter aggregate is advantageous. In this instance, it is possible to use as the driving power generator an electric motor controlled as a function of the generator's output voltage or optionally any other motor for example a diesel engine driving the generator coupled thereto. On the other hand, the generator can be adapted to supply the partial voltages needed in the necessary grading for the cascade generators, such a generator being provided with the corresponding windings tappings in particular embodiments either directly as DC voltage of a small pulsating output depending on the generator type or as an AC voltage of a higher frequency with partial voltages and rectification. The DC generator should then include several collectors and the AC generator several collector rings.

In a particular embodiment, the power generation of an internal combustion engine (petrol, hydrogen, methane or methanol, etc.) with a AC goupled generator of even higher frequency than say the mains frequency plus a rectifier would be very economical for motor vehicles since it would make it possible for an independently controllable AC motor to be provided separately for each axle of the vehicle. As a result of the fact that the internal combustion engine would be maintained at a practically constant speed of rotation, environmental protection regulations can be more readily met than by means of a motor which must be operated in a constantly variable speed of rotation due to gear changes. In another variant, the engine can be used to drive a generator which is used to charge a battery accumulator or battery accumulators. These batteries would be suitable not only for the feed of cascade generators but would also be suitable for the tapping of partial voltages.

In another application there is the possibility of providing an energy supply to rail vehicles by means of an AC current of a higher frequency than the mains frequency, using a conductor rail or an overhead contact line permitting smaller and less expensive dimensioning of the auto transformer 16 shown in FIG. 3. This would also require less expense to smooth the ripple so that each railway carriage might generate in itself the mechanical drive on each axle of the carriage without reliance upon the costly and expensive provision of a driving carriage or locomotive engine.

We claim:

1. A static circuit arrangement for the production of three-phase currents, comprising a plurality of waveform generating stages arranged in a series cascade, at least a first one of said stages comprising three waveform generating circuits connected in parallel; a respective current source for each said stage; and control means operable to render each one of said three circuits conductive in turn and connect the conductive circuit in series with the remainder of the cascade.

2. A circuit arrangement as claimed in claim 1, wherein at least some of the plurality of the waveform generating stages comprise transistor amplifier circuits.

3. A circuit arrangement as claimed in claim 2, wherein each transistor amplifier circuit is designed to have an output characteristic waveform substantially conforming to at least a part of the waveform of a desired output voltage.

4. A circuit arrangement as claimed in claim 1, wherein said three waveform generating circuits comprise transistor amplifier circuits which are controllable to act as switching circuits.

5. A circuit arrangement as claimed in claim 1, wherein the three waveform generating circuits comprise thyristor circuits which are controllable to act as switching circuits.

6. A circuit arrangement as claimed in claim 1, adapted for producing a sine wave, wherein the circuits for producing the positive and negative peaks of said sine waves, respectively, comprise at least one thyristor circuit.

7. A circuit arrangement as claimed in claim 2, having positive and negative branches, wherein said transistor amplifier stages are push-pull stages, with the emitter-collector paths of their transistors connected in series, and wherein a voltage to be amplifier is applied as a control voltage simultaneously to all stages.

8. A circuit as claimed in claim 7, further comprising means for applying said control voltage, said means comprising a transformer having a plurality of secondary windings, different one of said secondary windings being connected in the base circuit of different ones of said transistors.

9. A circuit arrangement as claimed in claim 7, wherein the transistors of the amplifier stages subsequent to said first stage are respectively blocked in the rest condition by a portion of the emitter-collector voltage of the transistor(s) of the preceding stage(s), and with increasing control voltage are successively unblocked and activated.

10. A circuit arrangement as claimed in claim 7, further comprising a common current supply transformer having a plurality of tappings arranged so that the component voltages between the tappings are suited to the particular gradient of a control voltage curve which corresponds to a desired output voltage curve, and a rectifier coupled to each one of said tappings and to a respective one of said amplifier stages.

11. A circuit arrangement as claimed in claim 7, further comprising an ohmic fixed resistance and a Zener diode connected in parallel with the emitter-collector paths of the transistors of the first to the (n-1)th stages, where n is the number of stages.

12. A circuit arrangement as claimed in claim 11, further comprising a load and wherein the first stages of the positive and negative branches of each phase are connected to the load.

13. A circuit arrangement as claimed in claim 12, wherein said load comprises three parts connected in star form, points of said star are connected to the respective circuits of said first stage, and further comprising pairs of opposed thyristors connected in delta form between the points of said star.

14. A circuit arrangement according to claim 1, comprising positive and negative branches, each branch having a first stage comprising three waveform generating circuits connected in parallel and followed by at least one transistorised amplifier stage connected in cascade to the first stage.

15. A circuit arrangement according to claim 14, further comprising three loads each connected to the waveform generating circuits of said positive and negative branches having the same phase output.

16. A circuit arrangement as claimed in claim 15, further comprising three pairs of opposed thyristors connected between said three loads.

17. A circuit arrangement as claimed in claim 14, further comprising a transformer having a plurality of tappings for providing component voltages to said stages.

18. A circuit arrangement as claimed in claim 14, wherein in order to supply each of the positive and negative branches with respective component voltages, said circuit arrangement further comprises a three phase supply, two half-wave rectifiers coupled to each phase of said supply, corresponding outputs of said rectifiers being combined to form live and neutral outputs, and rectifier arrangements coupled to said live and neutral outputs.

19. A circuit arrangement as claimed in claim 18, wherein each said rectifier arrangement comprises a transformer having a plurality of secondary windings, and one rectifier connected to each secondary windings, the rectifiers of said positive branch being connected in series and the rectifiers of said negative branch being connected in series.

20. A circuit arrangement as claimed in claim 14, wherein in order to provide each of said positive and negative stages with respective component voltages, the circuit arrangement further comprises a three phase supply circuit, and two half-wave rectifiers coupled to each phase of the supply, the positive outputs of the rectifiers being connected to one smoothing circuit, the negative outputs of the rectifiers being connected to another smoothing circuit.

21. A circuit arrangement as claimed in claim 20, further comprising a circuit for sub-dividing a voltage appearing across each said smoothing circuit, said circuit including a potential divider network, a plurality of transistors having their collector-emitter circuits coupled in series, the base electrodes of said transistors being connected to respective tappings of the potential divider network, and the emitters of said transistors being connected to terminals for providing the component voltages.

22. A circuit arrangement as claimed in claim 1, further comprising means for supplying each of the waveform circuits with a supply voltage in the form of alternate positive and negative half sine waves, each half wave having a duration equal to 120° of a complete cycle of the desired output frequency of the circuit arrangement.

23. A static circuit arrangement for the production of three-phase current, comprising a plurality of waveform generating stages arranged in cascade in a single, nonparallel arrangement; three partial loads, one associated with each phase of the current to be supplied, and three thyristors controlled in use to apply consecutive half waves in turn to the partial loads.

* * * * *